March 10, 1953 P. C. DARIN 2,631,013
HOLE DIGGING APPARATUS
Filed April 19, 1948 9 Sheets-Sheet 1

INVENTOR.
PETER C. DARIN
BY
Whittemore, Hulbert
& Belknap ATTORNEYS

March 10, 1953  P. C. DARIN  2,631,013
HOLE DIGGING APPARATUS
Filed April 19, 1948  9 Sheets-Sheet 6

INVENTOR.
PETER C. DARIN
BY
Whittemore, Hulbert
& Belknap
ATTORNEYS

March 10, 1953     P. C. DARIN     2,631,013
HOLE DIGGING APPARATUS Filed April 19, 1948     9 Sheets-Sheet 7

INVENTOR.
PETER C. DARIN
BY Whittemore, Hulbert & Belknap
ATTORNEYS

March 10, 1953 P. C. DARIN 2,631,013
HOLE DIGGING APPARATUS

Filed April 19, 1948 9 Sheets-Sheet 9

INVENTOR.
PETER C. DARIN
BY
Whittemore, Hulbert
& Belknap ATTORNEYS

Patented Mar. 10, 1953

2,631,013

UNITED STATES PATENT OFFICE 2,631,013

HOLE DIGGING APPARATUS

Peter C. Darin, Detroit, Mich., assignor to Darin & Armstrong Incorporated, Detroit, Mich., a corporation of Michigan Application April 19, 1948, Serial No. 21,887

10 Claims. (Cl. 255—19)

The present invention relates to hole digging apparatus.

It is an object of the present invention to provide hole digging apparatus carried by a crane mounted on a truck.

It is a further object to provide hole digging apparatus including a bucket having dump doors adapted to be opened by the operator when the bucket is at any predetermined height.

It is a further object of the present invention to provide hole digging apparatus comprising a rotatable bucket having bottom digging blades carried by bottom dump doors.

It is a further object of the present invention to provide hole digging apparatus comprising a vertical driveshaft carrying at its lower end a digging bucket, the shaft being supported from adjacent its top by a rotary thrust bearing.

It is a further object of the present invention to provide hole digging apparatus comprising a bucket having bottom dump doors in which the bucket may be raised or lowered as desired and the doors may be opened and closed as desired, each independently of the other.

It is a further object of the present invention to provide a hole digging apparatus comprising a bucket having bottom digging blades and having outwardly movable side digging blades adapted to enlarge the hole laterally at any point in its depth.

It is a further object of the present invention to provide hole digging apparatus comprising a vertically movable bucket, bottom dump doors on the bucket, and laterally movable side digging blades on the bucket in combination with means for opening and closing the bottom dump doors, opening and closing the side cutting blades, and raising and lowering the bucket, in which each of these operations may be carried out independently of the others.

Other objects and features of the invention will become apparent as the description proceeds, especially when taken in conjunction with the accompanying drawings, wherein:

The present invention was designed particularly to dig relatively large holes rapidly. It is particularly useful in construction work where it is desired to provide concrete piles or columns having a spread footing or mat. Accordingly, the present apparatus provides means for digging a relatively large hole as for example five feet in diameter to a substantial depth as for example ten feet, after which the bottom of the hole is laterally enlarged by a substantial amount, as for example to a diameter of ten feet. Concrete is then poured into the hole and provides a firm foundation inasmuch as it spreads laterally to provide a mat of extended area which carries the supporting column thereon.

Preferably the hole digging apparatus of the present invention is mounted upon a truck supported crane so that it may be moved quickly from position to position and the crane may be moved to locate the digging apparatus at the precise point selected.

Briefly described the invention comprises a bucket having one or more bottom dump doors hinged thereto, the doors being provided with cutting edges effective to move earth from the bottom of the hole upon rotation of the bucket and to force the earth into the bucket. The bucket is positively rotated through a vertical shaft of non-circular cross section and may be raised and lowered in conjunction with the shaft. The shaft itself is supported at its top by a rotary thrust bearing. The sides of the bucket are formed to provide a plurality of outwardly movable side cutting blades which are effective to enlarge the hole laterally at its bottom or at any desired intermediate point.

Rotation is imparted to the bucket through the medium of the vertical shaft in any position of vertical adjustment. Aside from rotation of the shaft the control of the other functions thereof is effected completely through two cables, one of which is connected to raise and lower the vertical shaft and the other of which is connected directly to the bottom dump doors. If both cables are raised simultaneously, the bucket will be raised without affecting the position of the bottom dump doors. If the cable suspending the shaft is stationary, the doors may be opened and closed in any vertical position of the bucket by raising and lowering the cables connected to the doors. Mechanism is provided which is dependent upon relative vertical movement between the bucket and vertical shaft for effecting in and out movement of the side cutting blades. Accordingly, if the bucket is suspended from the cables connected to the bottom dump doors, the side cutting blades may be opened or closed by vertical movement of the shaft, and as will be apparent this may take place in any position of the bucket and above the ground or at any desired depth in the hole.

It is accordingly possible to sink the hole to any desired depth, removing the earth by periodically raising the bucket and dropping the earth therefrom. When the hole has reached its predetermined depth the side cutting blades may be opened to any desired extent while the bucket is rotating so as to enlarge the hole laterally. This operation forces the earth removed by the side cutting blades into the bucket and the bucket may be raised to dump this earth after the side cutting blades have been moved to closed position.

With the foregoing general description in mind, the apparatus wil now be described in detail in conjunction with the several figures. The hole digging apparatus is preferably mounted on a truck such as indicated at 10 in the Figure 1 which includes a cab 11 and a pivot support 12 for a boom 13. At the upper portion of the boom are a plurality of sheaves 14, 15 and 16 over which lead cables 17, 18 and 19 respectively. One of the cables as for example the cable 18 which runs over the sheave 15 is appropriately secured to the boom and is employed to raise and lower the boom in a well known manner.

The cab is provided with drums D1, D2, and D3 for cables 17, 18, and 19 respectively, controlled by levers L1, L2, and L3. If the levers L1 and L3 controlling the drums D1 and D3 on which cables 17 and 19 are wound are moved in the same direction in unison, the blocks raised and lowered by these cables will move upwardly or downwardly in synchronism. Cranes of the type described above are disclosed in Patent No. 1,641,926 to Genung and accordingly, details of the operation of the crane are not disclosed herein.

The cables 17 and 19 suspend the hole digging apparatus as will be described subsequently in detail and are adapted to effect full control thereof with the exception of rotating the digging apparatus.

The hole digging apparatus comprises a generally cylindrical bucket 20 which is non-rotatably engaged with a vertical shaft 22, the shaft being of non-circular and perferably of square cross section. The bucket 20 is provided with a plurality of downwardly swinging bottom dump doors 24 and a plurality of extensible side cutting blades 26.

For ordinary digging the bucket 20 is rigidly secured to the shaft 22 for both rotation and vertical movement therewith. The upper end of the shaft 22 is supported for rotation by a thrust bearing 28, the bearing 28 being suspended from a bridle 30 which in turn is suspended by a hook 31 carried by a pulley block 32. The pulley block 32 is in turn suspended from the cable 19 and is adapted to be raised and lowered thereby.

Figures 3, 4:
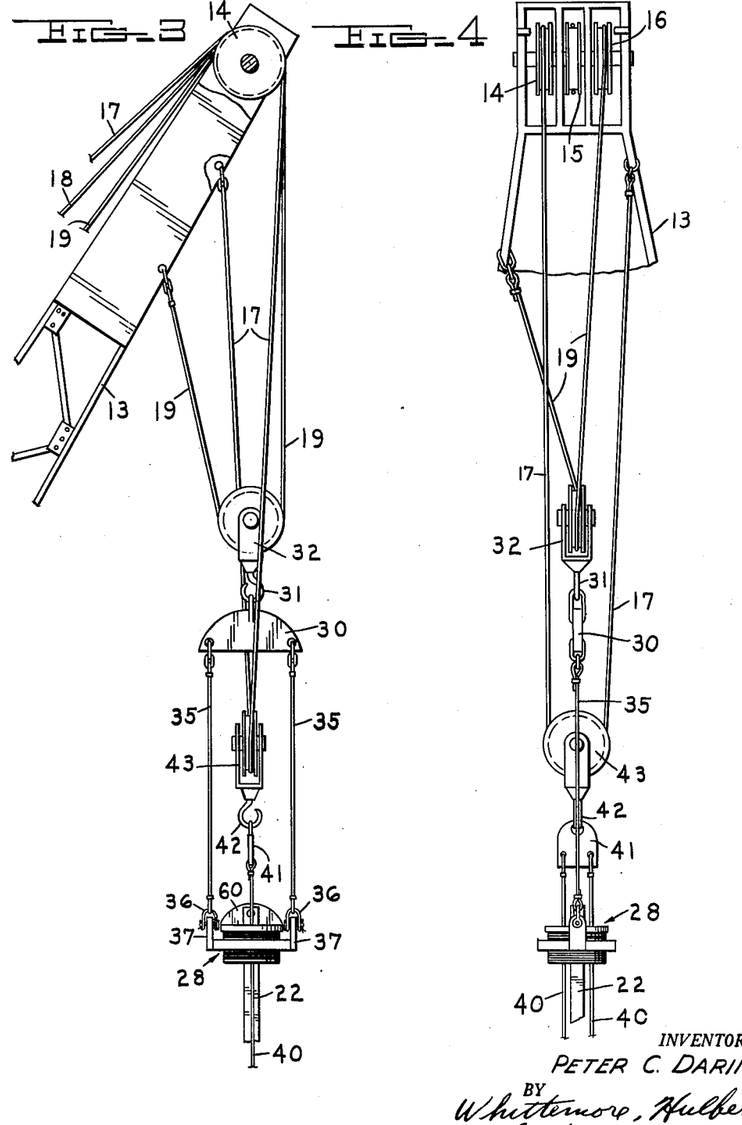
Figure 3 is a side elevation of the upper portion of the hole digging apparatus, Figures 1 and 3 together illustrating the complete apparatus.
Figure 4 is a front elevation of the top portion of the hole digging apparatus illustrated in Figure 3.

The bearing 28 is suspended from a bridle 30 by a pair of short cable lengths 35, these latter being connected to the bearing by clevises 36 detachably connected to upstanding ears 37 as well illustrated in Figures 3 and 4. The bottom dump doors 24 each have connected thereto cables 40 which extend upwardly through the bucket and through the bearing 28, above which they are connected to an equalizer bar 41 which in turn is suspended from the hook 42 swiveled to the bottom of a block 43. The block 43 is in turn suspended from the cable 17 by means of which it may be raised or lowered either independently of or simultaneously with the block 32.

From the foregoing it will be appreciated that the assembly made up of the vertical shaft 22 and the bucket 20 may be suspended in stationary relation at any height while the bottom dump doors 24 are opened or closed.

Figures 5, 6, 7, 8:
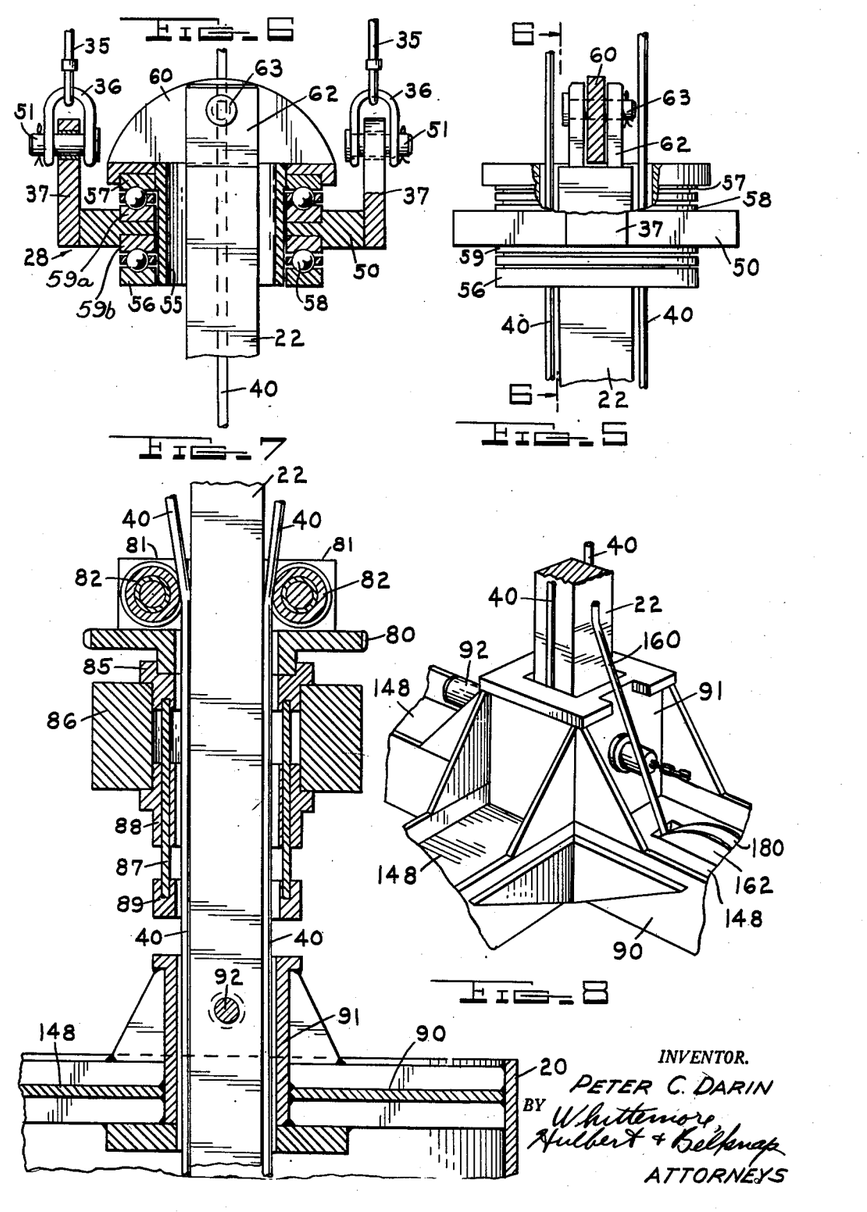
Figure 5 is a side elevation with parts broken away of the rotary thrust bearing employed in the apparatus.
Figure 6 is a section on the line 6—6 of Figure 5.
Figure 7 is an enlarged vertical section on the line 7—7 of Figure 1.
Figure 8 is a perspective view of the mechanism for transmitting torque to the vertical shaft.

Referring now to Figures 5 and 6, the bearing 28 is illustrated in detail. This bearing comprises a disc 50 to which are welded the upstanding ears 37, each of which is apertured to receive a pin 51 passing through the clevises 36 previously referred to. The bearing includes an internal sleeve 55 to which are secured ball races 56 and 57 against which the ball bearings 58 roll. The disc 50 is provided with the races 59a and 59b engaging the opposite sides of the balls 58. Extending across the upper open end of the sleeve 55 is a bar 60. The vertical shaft 22 is provided at its upper end with a pair of apertured ears 62 and the pin 63 is passed through the apertures in the bar 60 and the ears 62 to suspend the shaft 22 on the bearing. By virtue of this arrangement rotation of the shaft 22 in either direction and in any amount is permitted without twisting the cable 19 which suspends the boring structure.

Figures 1, 2:
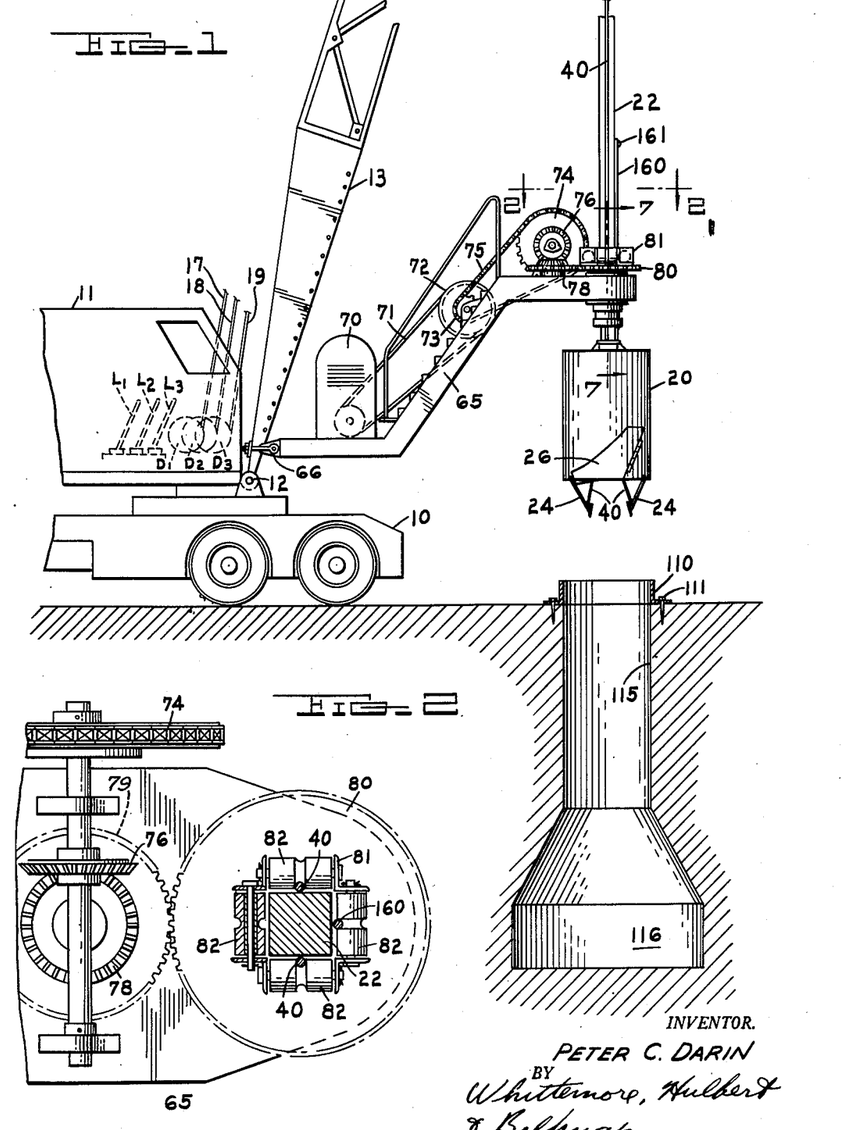
Figure 1 is a side elevation of the lower portion of the hole digging apparatus.
Figure 2 is a fragmentary enlarged section on the line 2—2 of Figure 1.

The means for imparting rotation to the bucket 20 are illustrated in part in Figure 1. Secured at a predetermined height on the lower portion of the boom 13 is a platform 65. One end of the platform is bolted or otherwise secured to the boom as indicated at 66 and the connection may be raised or lowered along the boom as desired to vary the height of the platform. The opposite end of the platform may be suspended from the boom by appropriate means (not shown). Mounted on the platform 65 is an internal combustion engine or electric motor 70 which is employed to effect rotation of the bucket 20. The exact means of transmitting power from the engine 70 to the shaft 22 is immaterial but in the present instance there is illustrated a belt or chain 71 driven by the engine and driving a rotary part 72 to which is connected a sprocket 73 which drives a larger sprocket 74 through a medium of a chain 75. Driven by the sprocket 74 is a bevel gear 76 meshing with a second bevel gear 78 connected to a gear 79 which drives a large driving gear 80. Any suitable means for conveying power from the motor or engine 70 to the drive gear 80 may be substituted.

The drive gear 80 is provided with a plurality of brackets 81 between which are mounted grooved rollers 82, the grooves being provided for the passage of cables therethrough. The rollers 82 lie close to the square sides of the shaft 22 and impart rotation to the shaft when the drive gear 80 is rotated. At the same time they permit the necessary vertical movement of the shaft 22 through the drive gear.

Referring now to Figure 7, the drive gear 80 is illustrated as mounted in a bearing 85 supported in a portion 86 of the platform 65. The upper bearing 85 has fixedly secured thereto a sleeve 87 which is fixedly secured to lower annular members 88 and 89. The bearing 85 and annular members 88 and 89 are centrally apertured to permit rotation of the shaft 22 therein.

The bucket 20 as best illustrated in Figures 8, 9, 10, 11, 12, 13, 14 and 15, is provided across its open top with a pair of crossing support struts 90 which are herein illustrated as H-shaped cross section. Secured centrally of the bucket by the struts 90 is a sleeve 91 of square cross section through which the lower end of the shaft 22 extends. When it is desired to prevent relative vertical movement between the shaft 22 and the bucket, a pin 92 is passed through two aligned openings formed in the sleeve 91 and the shaft 22.

Pivotally secured to the open underside of the bucket 20 are a pair of dump doors 24, each of which is provided with a hinge connection 101, and each of which includes a digging blade 102 preferably formed of hardened steel. Each of the bottom doors 24 is cut away as indicated at 103 to form an opening 104 through which earth removed by the blade 102 of the opposite door may pass to the interior of the bucket. Each of the doors 24 is provided with a ring or the like 105 to which one of the cables 40 is connected. Obviously when the shaft 22 and bucket 20 are maintained in stationary position, the doors 24 may be opened or closed by actuation of the cable 17 which affects vertical movement of the equalizer bar 41 and hence raises or lowers the door controlling cables 40.

With the mechanism thus far described it is possible to dig holes of a size equal to the diameter of a bucket, to raise the dirt from the hole and by swinging the crane, to move the bucket away from the hole. If it is desired to dump the contents of the bucket into a truck the platform 65 may be secured to the boom 13 at sufficient height to permit the bucket 20 to be raised so that a truck may be driven under it. If it is satisfactory to dump the earth on the ground the bucket need be raised only sufficiently above the hole to clear it.

With the bucket and shaft 22 raised clear of the hole, the earth may be dumped simply by lowering the pulley block 32. In order to provide the hole in the exact location desired it is preferable to use a guide ring 110 which may be staked to the ground by stakes indicated at 111. This means the bucket 20 may be guided into exact position as the hole is dug.

In many cases it is desirable to provide a hole having the shape illustrated in Figure 1. In this figure the hole is illustrated as comprising a vertical side portion 115 and an outwardly enlarged bottom portion 116. This shape of hole is particularly desirable in construction work in which concrete piles or columns are provided to support the building. In practice the hole is filled with concrete. The laterally enlarged portion 116 provides a foot or pad of increased area which increases the weight which the column can support. It has been the practice in the past to dig the hole either by mechanical means or otherwise and thereafter to enlarge the bottom of the hole to provide space for the pad by manual labor. This involves not only extra expense but it is hazardous and unpleasant work which is completely avoided by the present invention.

Broadly described, the mechanism for laterally enlarging the bottom of the hole comprises side digging blades which preferably are formed of portions of the sides of the bucket adjacent the bottom thereof. These blades are pivoted to the bucket and are adapted to be forced outwardly as the bucket is rotated at the bottom of the hole thereby cutting earth laterally and forcing it into the rotating bucket. The mechanism for accomplishing this result is illustrated particularly in Figures 9 and 15-22.

Figure 9:
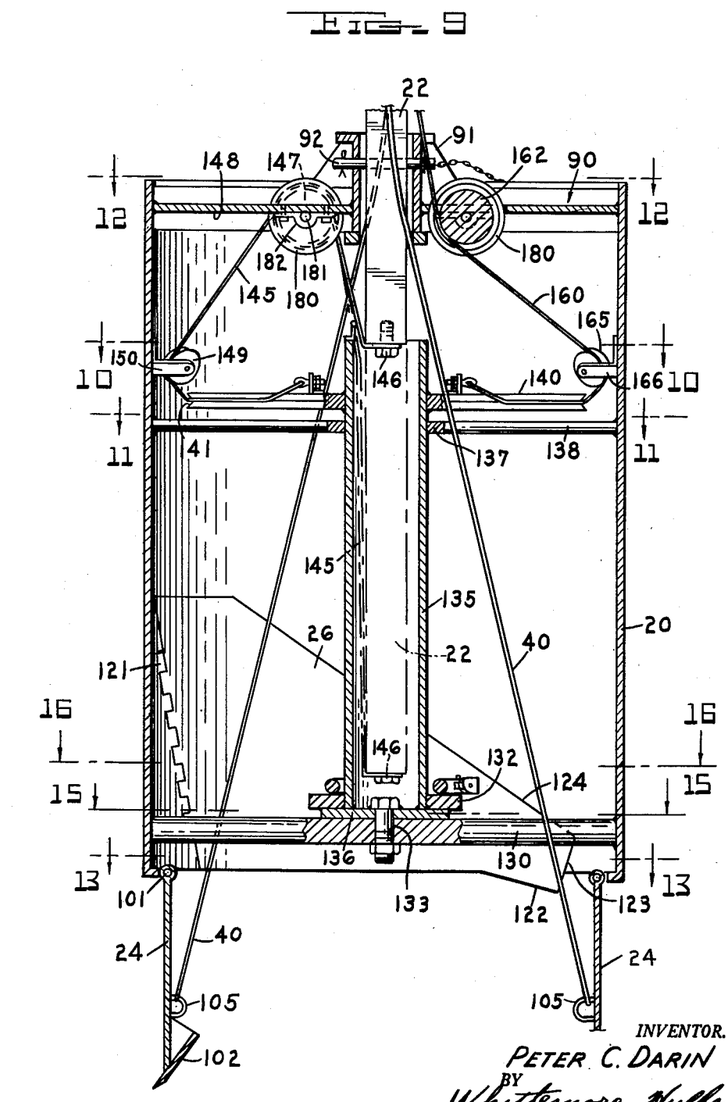
Figure 9 is a vertical section through the bucket.
Figure 21:
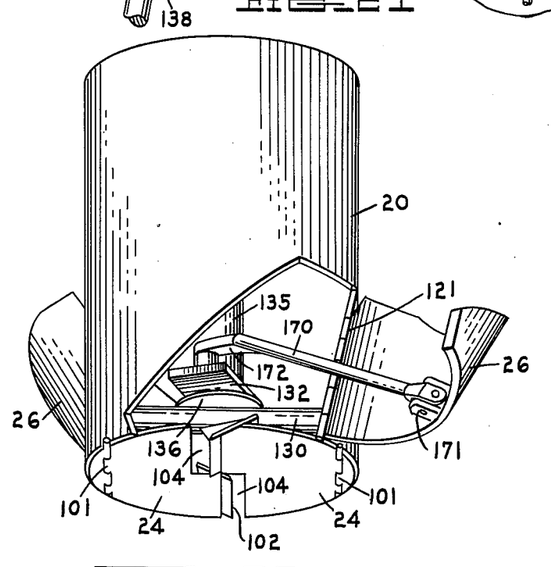
Figure 21 is a perspective view of the bucket with the bottom dump doors closed and the side cutting blades in open position.

The side digging blades are illustrated at 26 in Figure 9 and they are pivoted to the bucket along an inclined pivot axis as indicated at 121. The blades have downwardly extending tips 122 and front and top cutting edges 123 and 124 respectively. When the blades are extended outwardly as illustrated in Figure 21, they act as both cutting edges and scoops for moving the cut earth inwardly into the interior of the bucket. It will be understood that during lateral enlargement of the hole, the bottom dump doors 24 are preferably closed and the bucket 20 is maintained at a uniform height.

The mechanism for opening and closing the lateral cutting blades 26 depends upon relative vertical movement between the shaft 22 and the bucket 20. Accordingly, when it is desired to operate the lateral cutting blades, the pin 92 is removed to permit relative vertical movement between shaft 22 and bucket 20.

While different specific mechanisms may be employed to convert relative vertical movement between the bucket and shaft into lateral in and out movement of the side cutting blades, a preferred form of mechanism is illustrated in the figures under discussion.

Across the bottom of the bucket is a cross bar 130 to which is rotatably secured an assembly for effecting lateral in and out movement of the side cutting blades 26. This mechanism comprises a plate 132 which is pivoted to cross bar 130 by suitable means such as a bolt 133. Extending upwardly from the plate 132 and welded or otherwise rigidly secured thereto is a tubular sleeve 135. A bearing 136 is provided through which the pivot bolt 133 extends. As shown, bearing 136 is welded to plate 132 and sleeve 135, and rotates on cross bar 130.

The upper end of the sleeve 135 is supported in a ring 137 carried by a spider structure 138 secured to the inner surface of the bucket 20. The ring 137 forms a steadying support for the rotatable sleeve 135. Rigidly secured to the sleeve 135 above the ring 137 is a control wheel 140. The wheel is provided with a peripheral groove as indicated at 141 around portions of which actuating cables extend. Since the wheel 140 rotates with respect to the bucket 20, means must be provided for permitting passage of the bottom dump door controlling cables 40 therethrough and this means is illustrated as taking the form of elongated arcuate slots 143, best seen in Figure 10.

Figure 10:
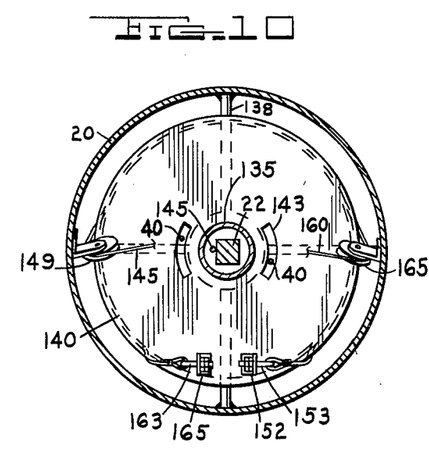
Figure 10 is a horizontal section through the bucket on the line 10—10 of Figure 9.

The first of the actuating cables is indicated at 145, one end of which is secured to the bottom of the shaft 22 as indicated at 146. The cable 145 leads upwardly through the sleeve 135 and over a pulley 147 which is illustrated as secured to the underside of the web 148 of one of the struts 90. Thence the cable 145 leads downwardly over a pulley 149 appropriately secured to the inner wall of the bucket as by the supporting bracket 150. The cable 145 thereafter leads around the periphery of the control wheel 140 in a clockwise direction as viewed in Figure 10, and its end is secured to the wheel 140 by a bracket 152 and a clevis connection 153. A second control cable 160 is secured to the shaft 22 some distance above the top of the bucket 20 as indicated at 161 in Figure 1. Cable 160 leads downwardly around a pulley 162 secured to the underside of one of the struts 90 as illustrated in Figure 9. Thereafter, the cable passes around a second pulley 165 which is secured to the inner surface of the bucket as by a bracket 166, and as best seen in Figure 10, the cable 160 leads around the grooved periphery of the wheel 140 in a counterclockwise direction and is secured to the wheel by means of a clevis connection or the like 163 secured to a bracket 165. It will be apparent from an inspection of Figures 9 and 10 taken together that as the shaft 22 moves downwardly from its full line position to its dotted line position in Figure 9, the cable 145 will be drawn downwardly over the pulley 147 and will apply a turning movement to the wheel 140 in a counterclockwise direction as seen in Figure 10. This motion is permitted since the cable 160 is payed out to the wheel 140 by the same movement. As the shaft 22 is moved from the dotted line to the full line position, the force is applied upwardly to the cable 160 which rotates the wheel 140 in a clockwise direction as seen in Figure 10.

Figure 16:
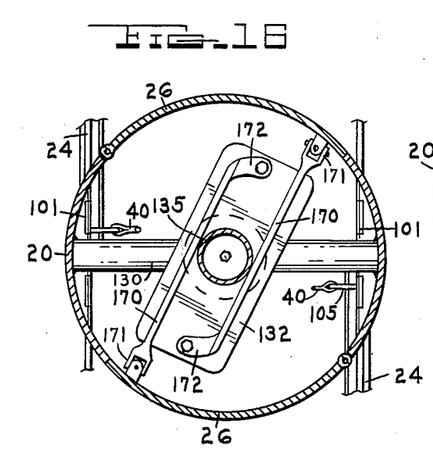
Figure 16 is a horizontal section through the bucket on the line 16—16 of Figure 9.
Figure 17:
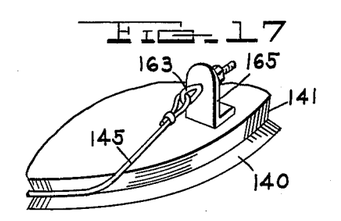
Figure 17 is a fragmentary perspective view illustrating the attachment of one of the rotating cables to the control wheel.
Figure 18:
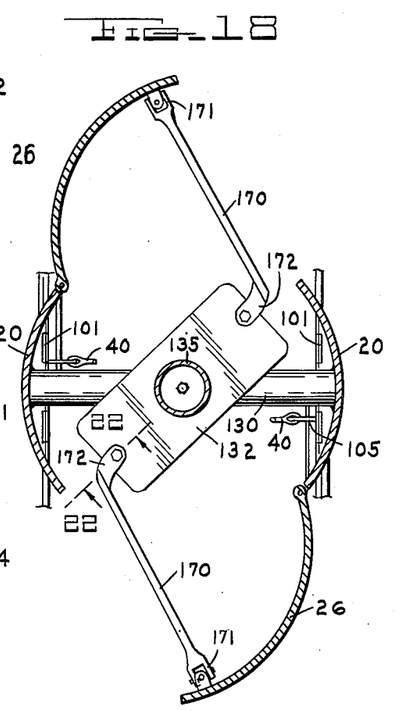
Figure 18 is a horizontal section similar to Figure 16 showing the side cutting blades in open or extended position.
Figure 22:
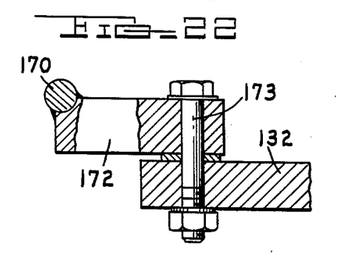
Figure 22 is a section on the line 22—22 of Figure 18.
Figure 23:
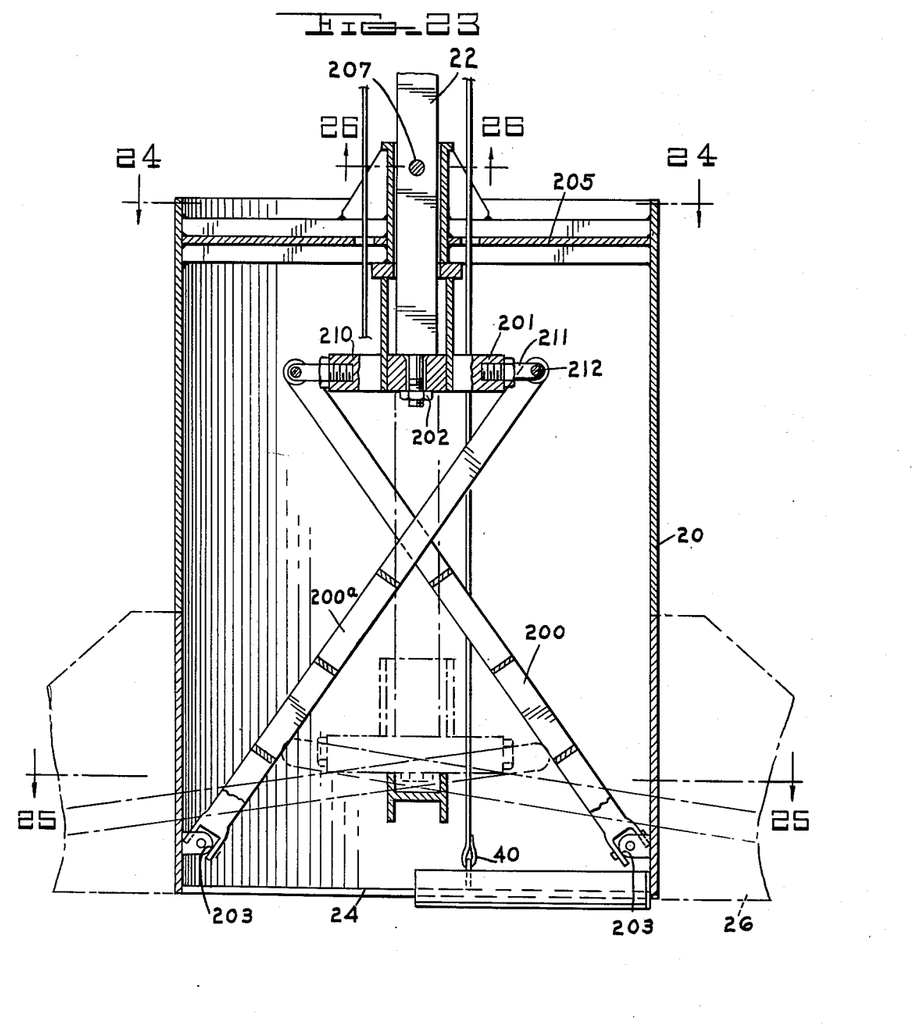
Figure 23 is a vertical section through a second embodiment of the present invention.

Rotation of the wheel is imparted to the sleeve 135 and thence to the plate 132. Referring now to Figure 16 the mechanism for transfering rotary movement of the plate 132 to in and out movement of the side cutting blades 26 will be described. To each end of the plate 132 is pivoted an actuating arm 170, this arm at its opposite end being connected by a universal joint 171 to the inner surface of a side cutting blade 26 adjacent its forward edge. Rotation of the plate 132 in a counterclockwise direction in Figure 16 provides a toggle action which swings the side cutting blades outwardly to the position illustrated in Figure 18. In order to provide for maximum opening, the arms 170 at their inner ends are provided with an offset portion 172, the construction of which is illustrated in Figure 22. The offset portion 172 is illustrated as comprising a separate piece pivoted to the plate 132 as by a bolt 173 and the arm 170 is illustrated as welded thereto. It will be recalled that the side cutting blades 26 are provided with pivot axes which are inclined from the vertical as well illustrated in Figures 9 and 21. This necessitates the provision of the universal connection 171 previously referred to. In practice, satisfactory results may be obtained by providing a loose connection between the outer end of the arm 170 and the inner surface of the side cutting blades 26.

Figure 11:
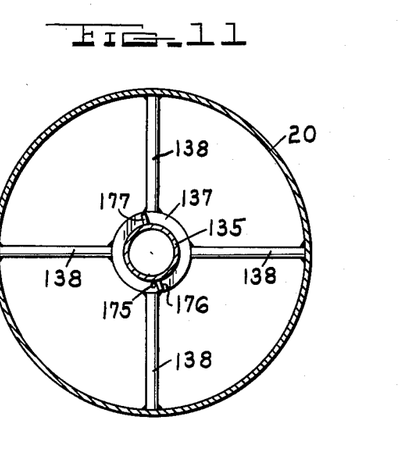
Figure 11 is a horizontal section through the bucket on the line 11—11 of Figure 9.
Figure 19:
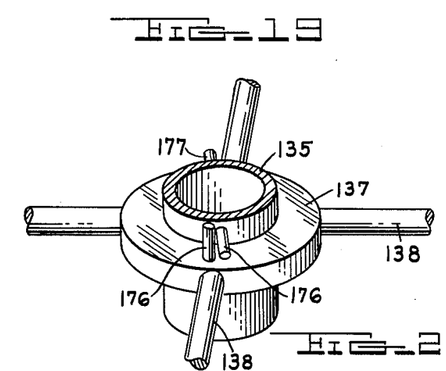
Figure 19 is a fragmentary perspective of the supporting spider seen in Figure 11.

If desired, suitable stop means may be provided for limiting the amount of opening of the side cutting blades. Such means are illustrated in Figures 11 and 19 and take the form of a stop pin 175 mounted on the ring 137 and a pair of pins 176 and 177 carried by the sleeve 135 in position to engage the stop pin 175 first on one side and then on the other. By this means rotation of the control wheel 140 is limited to somewhat less than 180°. If it is desired to limit the rotation of the control wheel 140 to a lesser arc, a pair of pins such as 175 may be positioned as required.

Figure 12:
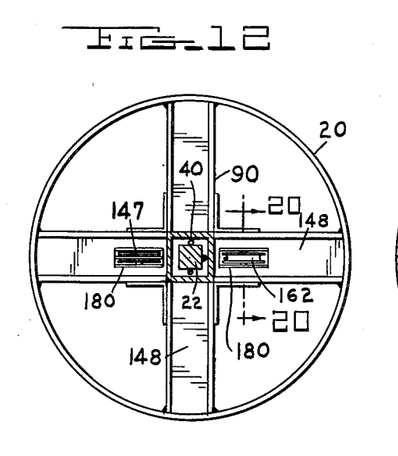
Figure 12 is a horizontal section through the bucket on the line 12—12 of Figure 9.
Figure 13:
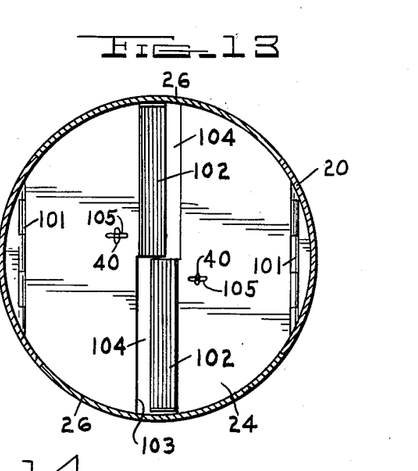
Figure 13 is a horizontal section through the bucket on the line 13—13 of Figure 9 in which figure, however, the bottom dump doors are illustrated in closed position.
Figure 14:
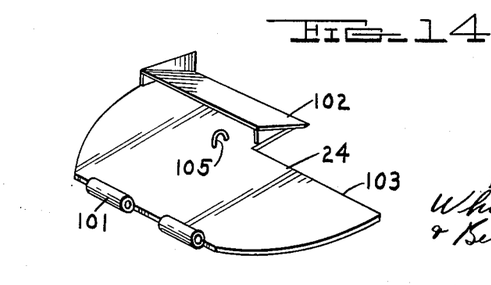
Figure 14 is a perspective view of one of the bottom dump doors disassembled from the bucket.
Figure 15:
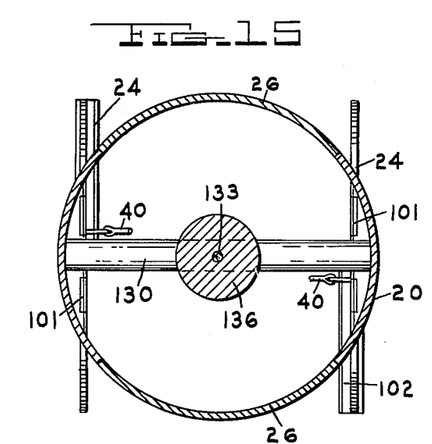
Figure 15 is a horizontal section through the bucket on the line 15—15 of Figure 9.
Figure 20:
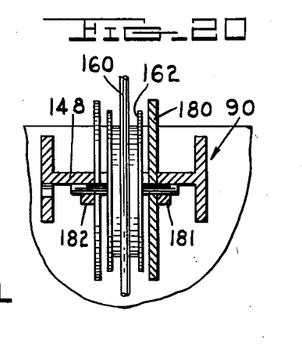
Figure 20 is a section on the line 20—20 of Figure 12.

Referring now to Figures 12 and 20 there is shown in detail the mounting for the pulley 147 and 162. Since these are identical only one will be described in detail. The strut 90 which was previously described and is of H shaped cross section has a web 148 which is slotted to receive a pair of side guard plates 180 between which the sheave 147 is mounted. The sheave is mounted for rotation on a pin 181 extending through pillow blocks 182 bolted or otherwise secured to the underside of the web 148.

It will be observed that the side cutting blades 26 extend completely to the bottom of the bucket 20 so that the lateral enlargement of the hole may be provided in alignment with the extreme bottom of the hole.

Referring now to Figures 23–26, there is illustrated a slightly different embodiment of the invention which differs in the specific mechanism for transforming the relative sliding movement between the shaft 22 and the bucket 20 into inward and outward movement of the side cutting blades 26. In this case instead of depending upon a control wheel such as 140, toggle bars 200 are provided which are pivoted to a cross head 201 rigidly secured to the underside of the shaft 22. The cross head 201 is pivoted to the lower end of the shaft 22 as for example by a loose nut and bolt connection illustrated at 202. The lower ends of the toggle bar 200 are provided with universal joint connections 203 to the inner surface of the side cutting blades 26 adjacent their free ends. Inasmuch as the side cutting blades are constrained to move in definite paths, downward movement of the shaft 22 will result in outward swinging of the side cutting blades 26 and in a corresponding rotation of the cross head 201.

Figure 24:
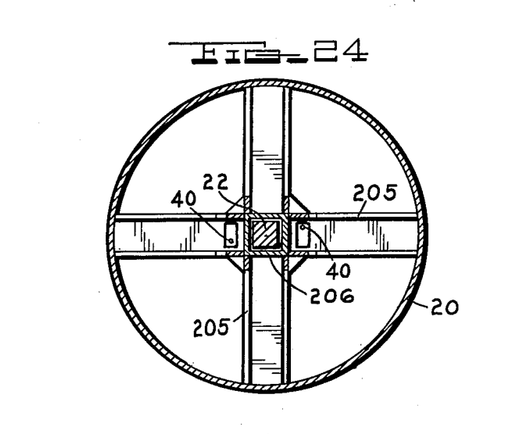
Figure 24 is a section on the line 24—24 of Figure 23.

In this case the inner construction of the bucket is somewhat simplified, there being provided only the cross struts 205 which are illustrated in Figure 24 as being of H shape and meeting to support a square collar 206 through which the shaft 22 is vertically slidable. The collar 206 is apertured to receive a pin 207 which is adapted to pass through a corresponding aperture adjacent the lower end of the shaft 22 so as to prevent relative vertical movement between the shaft 22 and the bucket 20.

Figure 25:
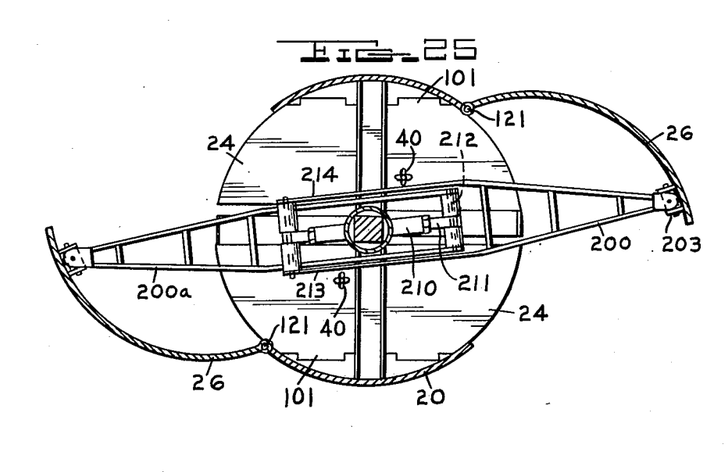
Figure 25 is a section on the line 25—25 of Figure 23.
Figure 26:
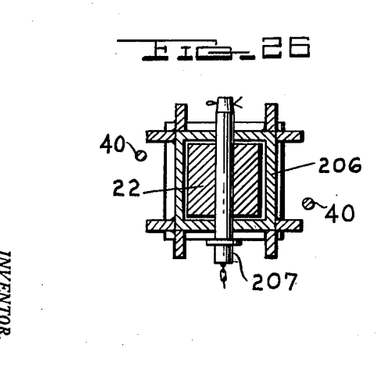
Figure 26 is a section on the line 26—26 of Figure 23.

The detailed construction of the cross head 201 is best seen in Figure 25 in which it will be observed that it comprises laterally extending arms 210 in the ends of which are received threaded eyelets 211 which support pivot pins 212. The ends of the toggle bars 200 are pivoted to the pins 212. In order to prevent interference between the toggle bars 200, one of the bars designated 200a in Figure 25 is narrower at its pivot end than the other and extends into the space between the outside bars 213 and 214 of the toggle bar 200.

From the foregoing description, the operation of the apparatus should be apparent but for completeness it will be reviewed. An operator seated in the cab 11 has before him three levers L1, L2, L3, each of which controls one of the drums D1, D2, D3, to which the cables 17, 18 and 19 are secured. In addition he is preferably provided with remote control means for the engine or motor 70 so that rotation of the bucket 20 may be under his control. The cab also of course contains controls for effecting rotary movement of the cab and boom 13 about a vertical axis.

If the apparatus is to be employed for straight drilling, relative vertical movement between the bucket 20 and the shaft 22 is prevented by the insertion of the pin 92. Assume that the dump doors 24 are closed and the bucket is located vertically over the hole to be dug. At this time the operator moves the levers L1 and L3 in the same direction so as to pay out the cables 17 and 19 at the same rate. This will result in vertical downward movement of the bucket until it contacts the ground or the bottom of the hole. The cables are paid out slightly further so that the dead weight of the bucket 20 and the shaft 22 rests upon the earth and provides the force necessary to cause the bottom cutting blades to dig in. When a desired amount of earth has been removed and forced into the bucket, the operator moves levers L1 and L3 in the opposite direction so as to raise the bucket 20. When the bucket 20 has been elevated to the desired height the boom 13 is rotated to move the bucket away from the hole. Thereafter the operator may cause the bottom doors 24 to open by moving the lever L3 so as to lower the block 32 or alternatively the lever L1 so as to further raise the block 43. In either event there is a relative vertical movement between the block 32 and 33 which will permit the doors 24 to swing downwardly of their own weight and to dump the earth contained in the bucket 20.

The doors 24 may be closed by moving the lever L3 in a direction to raise the block 43 while the block 32 is stationary or the lever L1 may be moved to lower the block 32 while the block 43 is maintained stationary. As soon as the doors are closed the levers L1 and L3 are moved in unison to cause the bucket to again be lowered in digging relation.

When the hole has been dug to the proper depth by the method outlined above, the bucket is raised and the pin 92 is removed so as to permit relative vertical slight movement between the bucket 20 and shaft 22. When this pin is removed, the doors 24 are retained closed as outlined above and the bucket assembly is lowered into the bottom of the hole. With the bucket resting on the bottom of the hole, the lever L1 is moved in a direction to lower the block 32 thereby permitting the weight of the shaft 22 to operate on the mechanism for opening the side cutting blades. The amount of opening of the blades is controlled by the amount which the block 32 is lowered. Normally this will be a gradual operation and the hole will be belled out at the bottom to its full extent after the shaft 22 is lowered the maximum permissible amount. Of course if less than the maximum permissible belling is required or desired, further downward movement of the shaft 22 is arrested at the desired point. Further digging by the bottom cutting blades will be prevented by suspending the bucket assembly from the door controlling cables 40. During the belling operation, when the bucket has received a desired amount of earth, the side cutting blades 26 are closed by raising the shaft 22 and when the doors are closed, levers L1 and L3 are operating in unison to cause synchronous vertical movement of the blocks 32 and 43 so as to elevate the bucket out of the hole. After the bucket has been swung away from the hole, the doors 24 may be opened as previously described, after which they may be closed, the bucket realigned with the hole, and lowered to the bottom of the hole for continuation of the belling process as just described.

The drawings and the foregoing specification constitute a description of the improved hole digging apparatus in such full, clear, concise and exact terms as to enable any person skilled in the art to practice the invention, the scope of which is indicated by the appended claims.

What I claim as my invention is:

1. In a boring device, a boring bucket having a bottom dump door hinged thereto, a vertical rotary drive shaft of non-circular cross-section connected to said bucket, a rotary drive member having a non-circular opening through which said shaft is slidable, a cable secured to said door for opening and closing said door, a roller carried by said drive member and engaging said shaft, said roller shaped to define with said shaft a passage in which said cable is vertically movable.

2. In a boring device, a boring bucket having a bottom dump door hinged thereto, a vertical rotary drive shaft of non-circular cross-section connected to said bucket, a rotary drive member having a non-circular opening through which said shaft is slidable, a cable secured to said door for opening and closing said door, a roller carried by said drive member and engaging said shaft, said roller grooved to define with said shaft a passage in which said cable is vertically movable.

3. In a boring device, a boring bucket having a pair of bottom dump doors hinged thereto, a vertical rotary drive shaft of non-circular cross-section connected to said bucket, a rotary drive member having a non-circular opening through which said shaft is slidable, a cable secured to each of said doors for opening and closing said doors, rollers carried by said drive member and engaging said shaft, said rollers grooved to define with said shaft passages in which said cable is vertically movable.

4. Boring apparatus comprising a crane having a cab and an adjustable boom, a platform on said boom, a rotary drive gear on said platform, said gear having an opening therethrough, a vertical drive shaft slidable in said opening, means on said gear for rotating said shaft, a boring bucket non-rotatably engaged with the lower end of said shaft, a bottom dump door hinged to said bucket, a bearing at the upper end of said shaft supporting said shaft and bucket and movable vertically with said shaft the extent required to withdraw the bucket from a hole being dug, first pulley means including a pulley carried by said boom for supporting said bearing, a cable connected to said door and extending upwardly through said platform to a point above said bearing, second pulley means including a pulley carried by said boom and having a swivel connection to said cable, said pulley means including drums in said cab and control means for said drums effective to produce selectively independent rotation of said drums in either direction and synchronous rotation of said drums in either direction.

5. Earth boring apparatus for boring vertical holes laterally enlarged at their bottom comprising a rotary bucket having combined bottom cutting blades and downwardly opening hinged dump doors, and hinged outwardly swinging side cutting blades, a vertical drive shaft for rotating said bucket, means providing for limited relative vertical movement between said bucket and said shaft, and toggle mechanism connected to said bucket and shaft and actuated by said relative movement for opening and closing said side cutting blades, said mechanism comprising a rotary part, levers pivoted to said part and connected to said side cutting blades, cable means wound around said part and connected to said bucket and said shaft, and independently operable vertically movable suspension means connected to said shaft and to said combined bottom cutting blades and dump doors.

6. Earth boring apparatus comprising a bucket having a pivoted bottom dump door and laterally movable side cutting blades, a vertical drive shaft having a rotary driving connection with said bucket, said bucket and shaft being relatively vertically movable, mechanism connected to said bucket, shaft and blades and operated by relative vertical movement between said shaft and bucket for effecting lateral movement of said side cutting blades, first cable means connected to said shaft and effective to raise and lower said shaft, second cable means connected to said bottom door and effective to open and close said bottom door and to raise and lower said bucket relative to said shaft.

7. Apparatus as defined in claim 6 including a drum for each of said cable means, and control means for said drums for selectively effecting synchronous or independent actuation of said drums in either direction.

8. Apparatus as defined in claim 6 in which said second cable means are connected directly to said bottom door.

9. In apparatus for laterally enlarging bored holes in the earth, a vertically movable drive shaft, a bucket at the lower end thereof, means connecting said bucket and shaft for relative vertical movement independently operated cable means for effecting vertical movement of said shaft and bucket and relative vertical movement between said shaft and bucket, side digging blades extensible from said bucket, a pulley in said bucket, a pair of cables around said pulley and having opposite ends connected respectively to said bucket and said pulley, and said shaft and said pulley, and lever means connected to said pulley and operated by rotation of said pulley for extending or retracting said blades, said bucket having bottom cutting blades and bottom dump doors, and means for opening and closing said doors.

10. Hole boring apparatus comprising a crane, a pair of hoisting drums on said crane, means for rotating said drums independently or synchronously in either direction, a boom, a cable operatively connected to each of said drums and including portions depending from said boom, a rotary bearing suspended directly from one of said cables, a rigid shaft of non-circular cross-section rotatably suspended from said bearing, a rotary drive element on said crane having a non-circular opening through which said shaft is slidable, a boring bucket on the bottom of said shaft, a dump door hinged to the bottom of said bucket, and swivel means suspended directly from the other of said cables and connected directly to said door.

PETER C. DARIN.

REFERENCES CITED

The following references are of record in the file of this patent:

UNITED STATES PATENTS

| Number | Name | Date |
|---|---|---|
| Re. 19,281 | Schroeder | Aug. 21, 1934 |
| Re. 21,241 | Bertran et al. | Oct. 24, 1939 |
| 1,103,518 | Kline | July 14, 1914 |
| 1,325,638 | Healey | Dec. 23, 1919 |
| 1,641,926 | Genung | Sept. 6, 1927 |
| 1,726,565 | Hunt | Sept. 3, 1929 |
| 1,731,732 | Terrell | Oct. 15, 1929 |
| 1,870,050 | Hunt | Aug. 2, 1932 |
| 1,905,995 | Bertran | Apr. 25, 1933 |
| 1,916,688 | Smith | July 4, 1933 |
| 1,999,115 | Shinn | Apr. 23, 1935 |
| 2,000,195 | Siebel | May 7, 1935 |
| 2,178,852 | Dunlap | Nov. 7, 1939 |